United States Patent Office 3,359,178
Patented Dec. 19, 1967

3,359,178
METHOD OF PRODUCING L-GLUTAMIC ACID
Katsunobu Tanaka and Kazuo Kimura, Machida-shi, and Ken Yamaguchi, Tokyo, Japan, assignors to Kyowa Hakko Kogyo Co., Ltd., Tokyo, Japan, a corporation of Japan
No Drawing. Filed Mar. 19, 1965, Ser. No. 441,339
Claims priority, application Japan, Mar. 23, 1964, 39/15,574
8 Claims. (Cl. 195—28)

ABSTRACT OF THE DISCLOSURE

L-glutamic acid is produced from an aqueous nutrient medium containing paraffinic hydrocarbon as carbon source by fermentation utilizing a microorganism capable of converting hydrocarbon into L-glutamic acid, said nutrient medium also containing not more than 20γ/liter of thiamine for enhancing the L-glutamic acid yield.

---

This invention relates to the microbiological production of L-glutamic acid, and more particularly to a fermentative method of producing L-glutamic acid, employing a hydrocarbon or a mixture of hydrocarbons as carbon source and a microorganism which is capable of producing L-glutamic acid when cultured in an aqueous nutrient medium containing such hydrocarbon(s). Still more particularly, the invention is concerned with improving the last-mentioned fermentative method of producing L-glutamic acid by the expedient of incorporating into the fermentation or nutrient medium an additament which functions to enhance the growth of the hydrocarbon-utilizing microorganisms with concomitant enhanced production of the desired L-glutamic acid.

A primary object of the present invention is the embodiment of a commercially feasible process for the microbiological or fermentative production of L-glutamic acid, using the readily available and correspondingly inexpensive source of carbon, namely, hydrocarbon or a mixture of hydrocarbons. Microorganisms are known which are capable of fermentatively converting hydrocarbon into amino acid. The quantity of amino acid produced is, however, so small—in reported cases of such conversion—that such processes can hardly be regarded as of significance in so far as the commercial production of glutamic acid is concerned. It is a desideratum in the art to be able to increase the yields of amino acid, and especially of L-glutamic acid, obtained by the fermentative and microbiological conversion of hydrocarbons as carbon source.

Briefly stated, the object of this invention is realized by the aforesaid expedient, the effective additament(s) being one or more of the following:

Thiamine,
p-Aminobenzoic acid,
Vitamin $B_{12}$,
Biotin.

The effects of these vitamins for the growth of hydrocarbon-converting microorganisms with concomitant production of L-glutamic acid in a culture medium containing n-undecane as carbon source are shown in the following table:

TABLE 1

| Name of strains | Culture medium A | | Culture medium B | | Culture medium C | |
|---|---|---|---|---|---|---|
| | Growth amounts, mg./ml. | Accumulation amounts of L-glutamic acid, mg./ml. | Growth amounts, mg./ml. | Accumulation amounts of L-glutamic acid, mg./ml. | Growth amounts, mg./ml. | Accumulation amounts of L-glutamic acid, mg./ml |
| Corynebacterium hydrocarboclastus No. 2438 | 2.4 | 0.5 | 9.8 | 5.1 | 10.1 | 5.2 |
| Arthrobacter simplex No. 3151 | 2.0 | 0.4 | 2.1 | 0.5 | 10.3 | 6.0 |
| Micrococcus roseus No. 401 | 2.1 | 0.3 | 9.5 | 5.2 | 10.2 | 8.1 |
| Brevibacterium maris No. 477 | 1.9 | 0.4 | 8.3 | 5.5 | 8.6 | 10.5 |

Culture medium A:

| | Wt. percent |
|---|---|
| $KH_2PO_4$ | 0.1 |
| $Na_2HPO_4 \cdot 12H_2O$ | 0.1 |
| $MgSO_4 \cdot 7H_2O$ | 0.1 |
| $MnSO_4 \cdot 4H_2O$ | 0.002 |
| $FeSO_4 \cdot 7H_2O$ | 0.02 |
| $(NH_4)_2SO_4$ | 2.0 |
| n-Undecane | 5.0 |
| Phenol red | 0.001 |
| $CaCO_3$ | 2.0 |
| Remainder water, pH 7.0. | |

Culture medium B: 5γ/liter of thiamine is added to Culture medium A.

Culture medium C: 5γ/liter of thiamine, 0.1 mγ/liter of vitamine $B_{12}$, 5γ/ml. of para-aminobenzoic acid and 0.3γ/liter of biotin are added to Culture medium A. (Culture conditions: 30° C., 220 r.p.m., 72 hours.)

The microorganism employed in carrying out the present invention is any one of those known to be able to fermentatively convert hydrocarbon into L-glutamic acid. Thus, use may be made more especially of microorganisms of the genera Corynebacterium and Arthrobacter, although as shown in Table 1 other hydrocarbon-converting microorganisms can also be employed.

As for the hydrocarbons used as assimilable carbon source in the process of the present invention, aliphatic hydrocarbons with 10 to 20 carbon atoms in the molecule can be used. However, best yields of L-glutamic acid are obtained with normal paraffins with 10 to 18 carbon atoms. Thus, useful hydrocarbons for the purposes of the present invention comprise decane, undecane, dodecane, tridecane, tetradecane, pentadecane, hexadecane, heptadecane, octadecane, nonadecane and eicosane, as the normal compounds or in the iso-forms, individually or in admixtures such as are frequently obtained in practice. However, the normal paraffins: n-decane, n-undecane, n-dodecane, n-tridecane, n-tetradecane, n-pentadecane, n-hexadecane, n-heptadecane and n-octadecane, severally or in admixture, e.g. in the form of commercial mixtures, give superior results. Hydrocarbons with 11 and 12 carbon atoms are preferred.

As to the previously-enumerated additaments, the amounts thereof are not specially limited. However, since in some circumstances, overgrowth thereof at the expense of the production of objective L-glutamic acid may occur, the most efficient ranges of said additaments are 0 to 10γ/liter of thiamine;
0 to 50γ/milliliter of p-aminobenzoic acid;
0 to 1 m.γ/liter of vitamin $B_{12}$;
0 to 10γ/liter of biotin.

The following table illustrates this in connection with thiamine, by way of example:

TABLE 2

| Amounts of thiamine in the culture medium, γ/liter | Growth amounts, mg./ml. | Accumulation amounts of L-glutamic acid, mg./ml. |
|---|---|---|
| 0 | 2.0 | 7.0 |
| 5 | 6.6 | 15.0 |
| 10 | 10.1 | 14.3 |
| 20 | 15.0 | 8.5 |
| 50 | 20.9 | 2.0 |

Strain employed: *Corynebacterium hydrocarboclastus* No. 2438.

Composition of culture medium:

| | | |
|---|---|---|
| $KH_2PO_4$ | weight percent | 0.1 |
| $Na_2HPO_4 \cdot 12H_2O$ | do | 0.1 |
| $MgSO_4 \cdot 7H_2O$ | do | 0.1 |
| $MnSO_4 \cdot 4H_2O$ | do | 0.002 |
| $FeSO_4 \cdot 7H_2O$ | do | 0.002 |
| $(NH_4)_2SO_4$ | do | 2.0 |
| n-Undecane | do | 5 |
| Phenol red | do | 0.001 |
| $CaCO_3$ | do | 2.0 |
| Thiamine | γ/liter | 0–50 |

Remainder water, pH 7.0.

Alternatively, over-growth may be inhibited by the incorporation into the fermentation medium of an appropriate antibiotic, such for example as penicillin, or a suitable surface active agent such as higher fatty acid or the like.

The method of isolating accumulated L-glutamic acid from the fermentation medium is per se not part of the present invention, and any conventional and suitable method may be employed for this purpose.

The following examples set forth presently preferred exemplary, but not limitative, embodiments of the invention. All percentages are by weight.

*Example 1*

20 milliliters of culture medium consisting of 0.1% of $KH_2PO_4$,
0.1% of $Na_2HPO_4 \cdot 12H_2O$,
0.1% of $MgSO_4 \cdot 7H_2O$,
0.002% of $FeSO_4 \cdot 7H_2O$,
0.002% of $MnSO_4 4 \cdot H_2O$,
5γ/liter of thiamine,
20% of $(NH_4)_2SO_4$,
5% of n-undecane, and
0.001% of phenol red,
Remainder water, at pH 7.0, were prepared in a conical flask with 250 ml. capacity, *Corynebacterium hydrocarboclastus* No. 2438 (ATCC No. 15592) was inoculated and incubated aerobically at 30° C. for 72 hours with shaking at 220 r.p.m. The accumulation amounts of L-glutamic acid in the culture liquor was 15.5 mg./ml. at the completion of cultivation. Thereafter L-glutamic acid was absorbed through cation exchange resin (Amberlite IR/20) and was eluted with dilute aqueous ammonia. About 220 milligrams of L-glutamic acid hydrochloride was obtained from the effluent according to the conventional method.

On the other hand the accumulation amounts of L-glutamic acid in the culture medium was only 0.2 mg./ml. without the addition of thiamine by the same method as above.

*Example 2*

To the same culture medium as in Example 1 in which 5% of kerosene was used as carbon source, *Corynebacterium hydrocarboclastus* No. 2438 was inoculated and aerobically incubated at 30° C. with shaking at 220 r.p.m. for 72 hours. About 35 mg. of L-glutamic acid hydrochloride was obtained by recovering 3.0 mg./ml. of L-glutamic acid which was accumulated at the completion of cultivation according to the same method as in Example 1.

Less than 0.1 mg./ml. of L-glutamic acid was produced by the similar culture method without thiamine.

*Example 3*

*Arthrobacter simplex* No. 3151 (ATCC No. 15799) was inoculated into 20 ml. of a culture medium consisting of 0.1% of $KH_2PO_4$,
0.1% of $Na_2HPO_4 \cdot 12H_2O$,
0.1% of $MgSO_4 \cdot 7H_2O$,
0.002% of $FeSO_4 \cdot 7H_2O$,
0.002% of $MnSO_4 \cdot 4H_2O$,
5γ/liter of thiamine,
0.1 m.γ/l. of vitamin $B_{12}$,
20% of $(NH_4)_2SO_4$,
5% of n-undecane, and
0.001% of phenol red
Remainder water, at pH 7.0, prepared in a conical flask with 250 ml. capacity and was incubated at 30° C. with shaking at 220 r.p.m. for 72 hours. 5.4 mg./ml. of L-glutamic acid was accumulated at the end of the cultivation. About 67 mg. of L-glutamic acid hydrochloride was obtained according to the method of Example 1.

When the culture medium without thiamine, vitamin $B_{12}$ or both of them is employed the accumulation amounts of L-glutamic acid are less than 0.1 mg./ml. respectively.

What is claimed is:

1. In a method for producing L-glutamic acid from hydrocarbon by fermentation of an aqueous nutrient medium containing paraffinic hydrocarbon as carbon source and a microorganism capable of converting hydrocarbon into L-glutamic acid, the improvement according to which the nutrient medium contains an amount of thiamine sufficient to enhance the yield of L-glutamic acid, such amount being less than 20γ of thiamine/liter.

2. The improvement according to claim 1, wherein the microorganism belongs to the genus Corynebacterium.

3. The improvement according to claim 1, wherein the microorganism belongs to the genus Arthrobacter.

4. The improvement according to claim 1, wherein the carbon source is constituted by kerosene.

5. The improvement according to claim 1, wherein the carbon source is constituted by n-undecane.

6. The improvement according to claim 1, wherein the microorganism is *Corynebacterium hydrocarboclastus* (ATCC No. 15592) and the culture medium contains 5γ/liter of thiamine and 5% of n-undecane as sole carbon source.

7. The improvement according to claim 1, wherein the microorganism is *Corynebacterium hydrocarboclastus* (ATCC No. 15592) and the culture medium contains 5γ/liter of thiamine and 5% of kerosene as sole carbon source.

8. The improvement according to claim 1, wherein the microorganism is *Arthrobacter simplex* (ATCC No. 15799) and the culture medium contains 5γ/liter of thiamine and 0.1 m.γ/liter of vitamin $B_{12}$ and, as sole carbon source, 5% of n-undecane.

References Cited
UNITED STATES PATENTS 3,222,258  12/1965  Iizuka et al. _____ 195—29

OTHER REFERENCES

Shiio et al.: Journal of General Applied Microbiology, vol. 9, No. 1, 1963, pages 23 to 30.

LIONEL M. SHAPIRO, *Primary Examiner.*

A. LOUIS MONACELL, *Examiner.*

L. M. SHAPIRO, *Assistant Examiner.*